United States Patent
Oteri et al.

(10) Patent No.: US 12,184,428 B2
(45) Date of Patent: Dec. 31, 2024

(54) METHODS FOR MULTI-PDSCH TRANSMISSION WITH MULTIPLE PUCCH RESOURCES

(71) Applicant: APPLE INC., Cupertino, CA (US)

(72) Inventors: Oghenekome Oteri, San Diego, CA (US); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Huaning Niu, Cupertino, CA (US); Seyed Ali Akbar Fakoorian, San Diego, CA (US); Sigen Ye, San Diego, CA (US); Wei Zeng, Cupertino, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,565

(22) PCT Filed: Aug. 5, 2021

(86) PCT No.: PCT/CN2021/111030
§ 371 (c)(1),
(2) Date: Sep. 21, 2021

(87) PCT Pub. No.: WO2023/010467
PCT Pub. Date: Feb. 9, 2023

(65) Prior Publication Data
US 2024/0031079 A1    Jan. 25, 2024

(51) Int. Cl.
*H04L 1/1829* (2023.01)
*H04L 1/1812* (2023.01)

(52) U.S. Cl.
CPC ........ *H04L 1/1854* (2013.01); *H04L 1/1812* (2013.01); *H04L 1/1861* (2013.01)

(58) Field of Classification Search
CPC .... H04L 1/1854; H04L 1/1812; H04L 1/1861
(Continued)

(56) References Cited

U.S. PATENT DOCUMENTS

2019/0312713 A1  10/2019  Yang et al.
2021/0105102 A1   4/2021  Li et al.
(Continued)

FOREIGN PATENT DOCUMENTS

| CN | 110324132 A | 10/2019 |
| CN | 112567668 A | 3/2021 |
| WO | 2021035437 A1 | 3/2021 |

OTHER PUBLICATIONS

3GPP TS 38.213, "3rd Generation Partnership Project; Technical Specification Group Radio Access Network; NR; Physical layer procedures for control (Release 15)", V15.1.0, Mar. 2018, 77 pages.
(Continued)

*Primary Examiner* — Nicholas R Taylor
*Assistant Examiner* — Chong G Kim
(74) *Attorney, Agent, or Firm* — Dorsey & Whitney LLP

(57) ABSTRACT

Disclosed are embodiments supporting multi-PDSCH transmission with multiple PUCCH resources by signaling the PDSCH-to-HARQ_feedback timing indicator, K1; identifying the PDSCH set associated with a PUCCH; constructing a Type 1 HARQ-ACK codebook; and constructing a Type 2 HARQ-ACK codebook.

16 Claims, 11 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2021/0266893 A1* | 8/2021 | Lee | ................. | H04L 1/1812 |
| 2022/0201660 A1* | 6/2022 | Tian | ................. | H04W 72/23 |
| 2022/0224455 A1* | 7/2022 | Falahati | ................. | H04L 5/0092 |
| 2022/0400508 A1* | 12/2022 | Oteri | ................. | H04W 72/23 |
| 2024/0040587 A1* | 2/2024 | Rastegardoost | ..... | H04W 72/232 |

OTHER PUBLICATIONS

PCT/CN2021/111030, International Search Report and Written Opinion, Apr. 26, 2022, 9 pages.

\* cited by examiner

| Option 1 | 1) The extended K1 set {5, 4, 3, 2, 1}. |
|---|---|
| | 2) How to determine a set of PDSCH reception occasions for each K1 value (i.e., pruning procedure) |
| | A. K1=5, R_5={R2_0} |
| | B. K1=4, R_4={R2_0, R2_1} |
| | C. K1=3, R_3={R2_1, R1_0, R2_2} |
| | D. K1=2, R_2={R1_0, R2_2, R0_0, R1_1, R2_3} |
| | E. K1=1, R_1={R0_0, R1_1, R2_3} |
| | Totally 5 bits for extended K1 set. |
| | 3) HARQ-ACK bit generation based on determined PDSCH reception occasions |
| | 1 bit for each PDSCH reception occasion. So totally we have 5 HARQ-ACK bits. |

| Option 1a (option 1 would also work) | 1) No K1 set extension: K1 set = {1,2} |
|---|---|
| | 2) How to determine a set of PDSCH reception occasions for each K1 value (i.e., pruning procedure): |
| |     a) For each K1, and each row of TDRA, a set of candidate PDSCH reception occasions are determined by the SLIV(s) and offset between each SLIV(s), e.g. separate k0 value. |
| |     a) For K1=1, row_1, set of candidate slots: {N-1} |
| |     b) For K1=1, row_2, set of candidate slots: {N-2, N-1} |
| |     c) For K1=1, row_3, set of candidate slots: {N-4, N-3, N-2, N-1} |
| |     d) For K1=2, row_1, set of candidate slots: {N-2} |
| |     e) For K1=2, row_2, set of candidate slots: {N-3, N-2} |
| |     f) For K1=2, row_3, set of candidate slots: {N-5, N-4, N-3, N-2} |
| |     b) exclude a candidate slot if the SLIV candidate overlaps with semi-static UL symbol |
| | The candidate PDSCH reception occasions are derived by union of none overlapped candidate slots: {N-5, N-4, N-3, N-2, N-1} |

FIG. 3

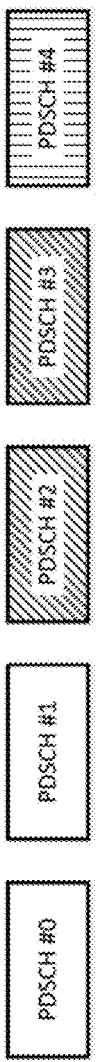
FIG. 4

| # PDSCH | X | Alt 2-2-1 | Alt 2-2-2 |
|---|---|---|---|
| 5 | 1 | {0},{1},{2},{3},{4} | {0},{1},{2},{3},{4} |
| 5 | 2 | {0,1},{2,3},{4} | {0,1},{2,3},{4,X} |
| 5 | 3 | {0,1,2},{3,4} | {0,1,2},{3,4,X} |
| 5 | 4 | {0,1,2,3},{4} | {0,1,2,3},{4,X,X,X} |
| 5 | 5 | {0,1,2,3,4} | {0,1,2,3,4} |

FIG. 6

METHODS FOR MULTI-PDSCH TRANSMISSION WITH MULTIPLE PUCCH RESOURCES

TECHNICAL FIELD

This application relates generally to wireless communication systems, including multi-physical downlink shared channel (PDSCH) transmission with multiple physical uplink control channel (PUCCH) resources.

BACKGROUND OF THE DISCLOSURE

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is set of tables showing options for determining a set of PDSCH reception occasions for an extended K1 set (top of FIG. 3) and a conventional K1 set (bottom of FIG. 3).

FIG. 4 is a block diagram and table showing PDSCH grouping, according to one embodiment.

FIG. 6 is a table showing PDSCH grouping, according to one embodiment.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
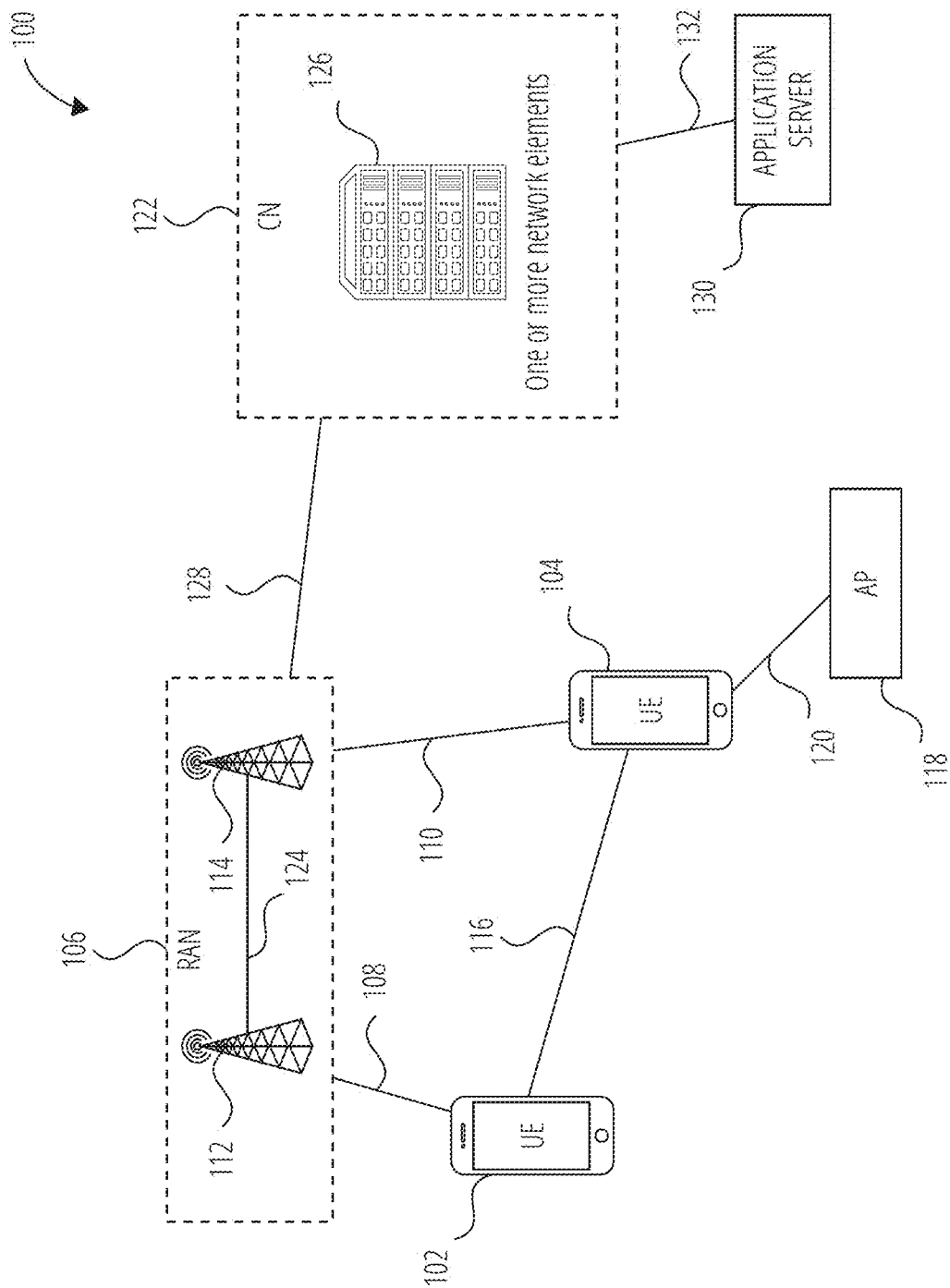
FIG. 1 is a block diagram showing an example architecture of a wireless communication system, according to embodiments disclosed herein.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, wireless communication system 100 includes UE 102 and UE 104 (although any number of UEs may be used). In this example, UE 102 and UE 104 are illustrated as smartphones (e.g., handheld touchscreen mobile computing devices connectable to one or more cellular networks), but may also comprise any mobile or non-mobile computing device configured for wireless communication.

UE 102 and UE 104 may be configured to communicatively couple with a RAN 106. In embodiments, RAN 106 may be NG-RAN, E-UTRAN, etc. UE 102 and UE 104 utilize connections (or channels) (shown as connection 108 and connection 110, respectively) with RAN 106, each of which comprises a physical communications interface. RAN 106 can include one or more base stations, such as base station 112 and base station 114, that enable connection 108 and connection 110.

In this example, connection 108 and connection 110 are air interfaces to enable such communicative coupling, and may be consistent with RAT(s) used by RAN 106, such as, for example, an LTE and/or NR.

In some embodiments, UE 102 and UE 104 may also directly exchange communication data via a sidelink interface 116. UE 104 is shown to be configured to access an access point (shown as AP 118) via connection 120. By way of example, connection 120 can comprise a local wireless connection, such as a connection consistent with any IEEE 802.11 protocol, wherein AP 118 may comprise a Wi-Fi™ router. In this example, AP 118 may be connected to another network (for example, the Internet) without going through a CN 122.

In embodiments, UE 102 and UE 104 can be configured to communicate using orthogonal frequency division multiplexing (OFDM) communication signals with each other or with base station 112 and/or base station 114 over a multi-carrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of base station 112 or base station 114 may be implemented as one or more software entities running on server computers as part of a virtual network. In addition, or in other embodiments, base station 112 or base station 114 may be configured to communicate with one another via interface 124. In embodiments where wireless communication system 100 is an LTE system (e.g., when CN 122 is an EPC), interface 124 may be an X2 interface. The X2 interface may be defined between two or more base stations (e.g., two or more eNBs and the like) that connect to an EPC, and/or between two eNBs connecting to the EPC. In embodiments where wireless communication system 100 is an NR system (e.g., when CN 122 is a 5GC), interface 124 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 122).

RAN 106 is shown to be communicatively coupled to CN 122. CN 122 may comprise one or more network elements 126, which are configured to offer various data and telecommunications services to customers/subscribers (e.g., users of UE 102 and UE 104) who are connected to CN 122 via RAN 106. The components of CN 122 may be implemented in one physical device or separate physical devices including components to read and execute instructions from a machine-readable or computer-readable medium (e.g., a non-transitory machine-readable storage medium).

In embodiments, CN 122 may be an EPC, and RAN 106 may be connected with CN 122 via an S1 interface 128. In embodiments, S1 interface 128 may be split into two parts, an S1 user plane (S1-U) interface, which carries traffic data between base station 112 or base station 114 and a serving gateway (S-GW), and the S1-MME interface, which is a signaling interface between base station 112 or base station 114 and mobility management entities (MMEs).

In embodiments, CN 122 may be a 5GC, and RAN 106 may be connected with CN 122 via an NG interface 128. In embodiments, NG interface 128 may be split into two parts, an NG user plane (NG-U) interface, which carries traffic data between base station 112 or base station 114 and a user plane function (UPF), and the S1 control plane (NG-C) interface, which is a signaling interface between base station 112 or base station 114 and access and mobility management functions (AMFs).

Generally, an application server 130 may be an element offering applications that use internet protocol (IP) bearer resources with CN 122 (e.g., packet switched data services). Application server 130 can also be configured to support one or more communication services (e.g., VoIP sessions, group communication sessions, etc.) for UE 102 and UE 104 via CN 122. Application server 130 may communicate with CN 122 through an IP communications interface 132.

There has been an effort to study interoperation in the 52.6-71 gigahertz frequency range. At this range, however, there is a lot of phase noise as an impairment. In FR1 and FR2 the maximum subcarrier spacing is 120 kilohertz. And to address the phase noise issue, subcarrier spacing is increased to a maximum of 960 kilohertz. When the subcarrier spacing is increased by a factor of eight, symbol duration drops by a factor eight. To perform physical downlink control channel (PDCCH) monitoring, that means a processor would need to run eight times as fast. Running a chip eight times as fast means there would be an eightfold increase in complexity of the processor. Alternatively, an agreement in the 3GPP standards body has been to adopt something called multi-slot PDCCH monitoring, which means that rather than monitoring the PDCCH every slot, it is multiplied once every X number of slots, e.g., once every eight slots. But that causes an issue when, for example, monitoring in slot one and in slot nine and transmitting a physical uplink shared channel (PUSCH) or PDSCH in slot seven. A solution for a UE and for a serving cell is scheduling multiple PDSCHs by single DL downlink control information (DCI) and scheduling multiple PUSCHs by single UL DCI.

More specifically, there have been several agreements for 3GPP standards concerning multi-PxSCH transmission, where PxSCH may be PDSCH (DL) or PUSCH (UL). First, as noted, there is an agreement for a UE and for a serving cell, scheduling multiple PDSCHs by single DL DCI and scheduling multiple PUSCHs by single UL DCI. Each PDSCH or PUSCH has individual/separate TB(s) and each PDSCH/PUSCH is confined within a slot. The multi-PUSCH scheduling defined in Rel-16 NR-U is the baseline for multi-PxSCH scheduling in Rel-17. This approach does not use fallback DCI (i.e., DCI formats 0_0 and 1_0) for multi-PDSCH/PUSCH scheduling. It employs DCI format 0_1 to schedule multiple PUSCHs with a single DCI. It employs DCI format 1_1 to schedule multiple PDSCHs with a single DCI.

Figure 2:
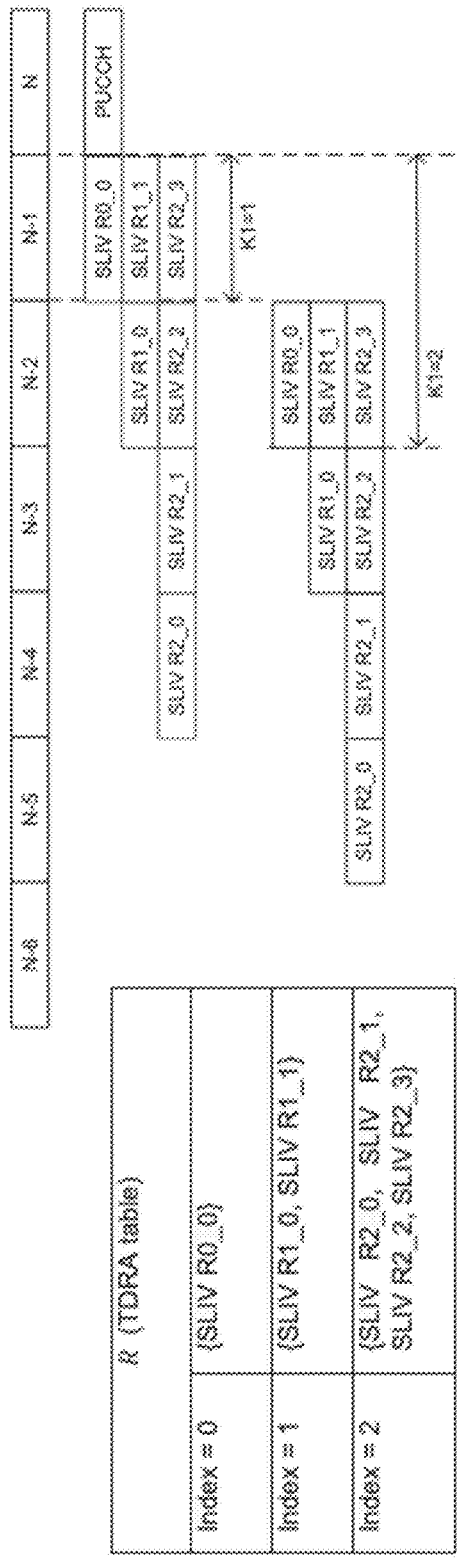
FIG. 2 is set of tables showing Type 1 hybrid automatic repeat request-acknowledgement (HARQ-ACK) codebook construction for a single PUCCH.

Second, as shown in FIG. 2, there is an agreement for enhancements of generating type-1 HARQ-ACK codebook corresponding to DCI that can schedule multiple PDSCHs. In view of the original K1 set being limited to two, the following options shown on FIG. 3 can be considered.

Option 1 (top of FIG. 3) is that the set of candidate PDSCH reception occasions is determined according to each start and length indicator (SLIV) of each row in a time domain resource allocation (TDRA) table and based on extension of K1 set. Option 1a (bottom of FIG. 3) is that the set of candidate PDSCH reception occasions is determined according to each SLIV of each row in the TDRA table. Option 2 (not shown) is that the set of candidate PDSCH reception occasions is determined according to the last SLIV of each row in the TDRA table.

Third, there is an agreement for generating type-2 HARQ-ACK codebook corresponding to DCI that can schedule multiple PDSCHs. And this disclosure presents the following alternatives to downlink assignment index (DAI) counting and will be down-selected in RAN1 #104bis-e. Alternative 1 is that a counter-DAI/total-DAI (C-DAI/T-DAI) is counted per DCI. Alternative 2 is that C-DAI/T-DAI is counted per PDSCH. Alternative 3 is that C-DAI/T-DAI is counted per M scheduled PDSCH(s), where M is configurable (e.g., 1, 2, 4, . . . ).

In RAN1 #104-e, the following agreement was made. For a DCI scheduling multiple PDSCHs, HARQ-ACK information corresponding to PDSCHs scheduled by the DCI is multiplexed with a single PUCCH in a slot that is determined based on K1, where K1 (indicated by the PDSCH-to-HARQ_feedback timing indicator field in the DCI or provided by dl-DataToUL-ACK if the PDSCH-to-HARQ_feedback timing indicator field is not present in the DCI) indicates the slot offset between the slot of the last PDSCH scheduled by the DCI and the slot carrying the HARQ-ACK information corresponding to the scheduled PDSCHs. It is noted that granularity of K1 can be separately discussed. The issue of whether or not HARQ-ACK information corresponding to different PDSCHs scheduled by the DCI can be carried by different PUCCH(s) was identified for future study.

In a scenario with multiple PUCCHs for multi-PDSCH transmission, an updated design is desired for multiple issues such as signaling and codebook design. For example, there are issues to address with respect to: (1) signaling the PDSCH-to-HARQ_feedback timing indicator, K1; (2) identifying the PDSCH set associated with a PUCCH; (3) Type 1 HARQ-ACK codebook design; and (4) Type 2 HARQ-ACK codebook design. These are addressed as follows.

First, this disclosure addresses whether or not HARQ-ACK information corresponding to different PDSCHs scheduled by the DCI can be carried by different PUCCH(s). In one embodiment, this functionality is not allowed. In other embodiments where the functionality is allowed, there is an issue as to how the PDSCH-to-HARQ_feedback timing indicator, K1 is signaled. A first option is that K1 is common for each PDSCH set. A PDSCH set is defined as a sub-set of the transmitted PDSCH transmissions associated with a specific PUCCH transmission. A single value of K1 is signaled per DCI. A second option is that K1 is independent for each PDSCH set. An independent value of K1 is for each PDSCH set in the DCI.

Second, this disclosure addresses identifying the PDSCH set associated with a PUCCH resource. Three approaches are described, and each approach includes several alternatives.

A first approach for identifying the PDSCH set entails the PDSCH set being implicitly defined based on pre-defined rules. For example, for multi-channel occupancy time (COT) transmission with multiple PDSCHs in each COT, PDSCH transmissions in each separate COT are defined as a PDSCH set. This could be subject to limitations on the timeline, e.g., a PDSCH transmission is too close to the end of the COT may be assigned to the PDSCH set in the next COT.

A second approach for identifying the PDSCH set entails a gNB signaling the UE with a maximum number of PUCCH transmissions (X) per multi-PDSCH transmission. This can be configured semi-statically using RRC configuration or indicated dynamically (MAC-CE or DCI). In this embodiment, there is a common understanding between the gNB and UE on the meaning of X.

A first alternative of the second approach (Alt 2-1) entails, for each multi-PDSCH TDRA entry, the UE splits the multi-PDSCH transmissions into X groups with each group mapped to a PUCCH. In scenarios where the number of PDSCH is a multiple of X, an equal number of PDSCH transmissions are assigned to each PUCCH. In scenarios where the number PDSCHs is not a multiple of X, an unequal number of PDSCH transmissions are assigned to each PUCCH.

FIG. 4 shows two specific examples and a more general table of an alternative 2-1-1 for transmitting an exact number of PDSCHs in PUCCH resources by assigning a subset of the PDSCH transmissions to a specific PUCCH. This alternative uses a set of rules for assigning a number of PDSCHs to a group. An example pseudocode algorithm to find a number of PDSCH transmissions in each PUCCH index is as follows. For a count from zero to the number of (PDSCH minus one), a PUCCH_index=mod(count, X), and the PDSCH_number(PUCCH_index) is equal to PDSCH_number(PUCCH_index)+1. This algorithm allocates PDSCH transmissions to the PUCCH resources. The top example of FIG. 4 shows the allocation of five PDSCH with a maximum of two PUCCH transmissions (X) per multi-PDSCH transmission. A middle example shows X=3. And a bottom table shows examples from X=1 to 5.

Figure 5:
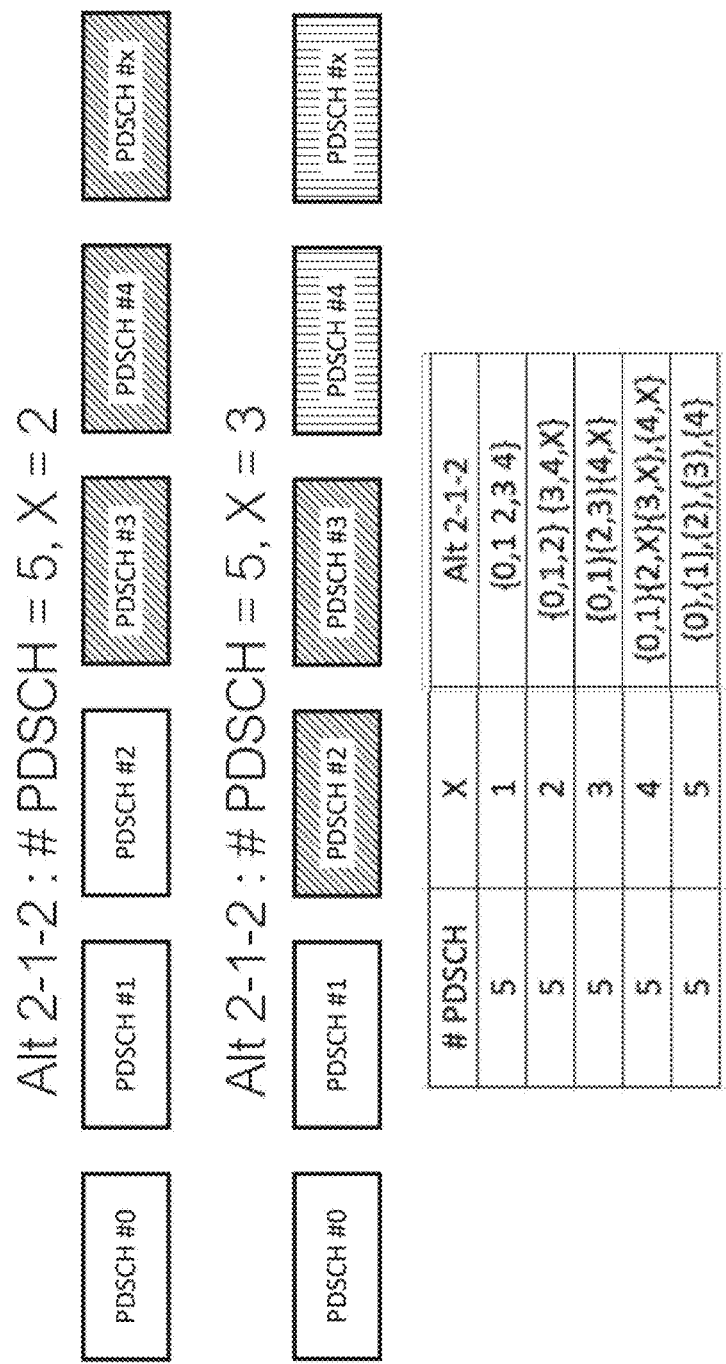
FIG. 5 is a block diagram and table showing PDSCH grouping, according to one embodiment.

FIG. 5 shows two specific examples and a more general table of an alternative 2-1-2, which uses a formula for assigning a number of PDSCHs to a group. A formula is as follows: transmit ceil(number PDSCHs/X) HARQ-ACKs in the PUCCH resources. As shown in a top example of FIG. 5, five PDSCH divided by two (X), equals 2.5, so the ceiling function of 2.5 is three. Three, therefore, is the number of PDSCHs per group. Each group is then assigned to a subset of the PUCCH. A NACK may be transmitted in the PUCCH resources with no PDSCH transmission assigned. A middle example of FIG. 5 shows X=3. And a bottom table shows examples from X=1 to 5.

FIG. 6 shows a second alternative of the second approach (Alt 2-2) entails the gNB configuring UE with a maximum number (Y) of PDSCHs per PUCCH for multi-PDSCH transmission. For each multi-PDSCH TDRA entry that the UE allocates, there are Y PDSCHs to each PUCCH. More specifically, FIG. 6 shows two scenarios where the number of PDSCHs is not a multiple of X. In an alternative 2-2-1 the last PUCCH contains HARQ-ACKs corresponding to a smaller number of PDSCHs. IN an alternative 2-2-2 the last PUCCH contains additional HARQ-ACKs (NACKs) to ensure equal number of PDSCHs.

A third approach for identifying the PDSCH set entails the gNB explicitly signaling which PDSCHs are in which PUCCH group. A first alternative is that a gNB indicates a number of PUCCH transmissions per multi-PDSCH transmission with corresponding number of PDSCHs in each PUCCH, e.g., {3,3,2}. A second alternative is that a gNB indicates a number of PUCCH transmissions per multi-PDSCH transmission with start index (indices) of PDSCH that is transmitted in each PUCCH, e.g., {1,4,7}. A third alternative is that a gNB indicates a number of PUCCH per multi-PDSCH transmission with index relative to implicitly indicated size, e.g., size=2, {+1,+1,0}.

Figure 7:
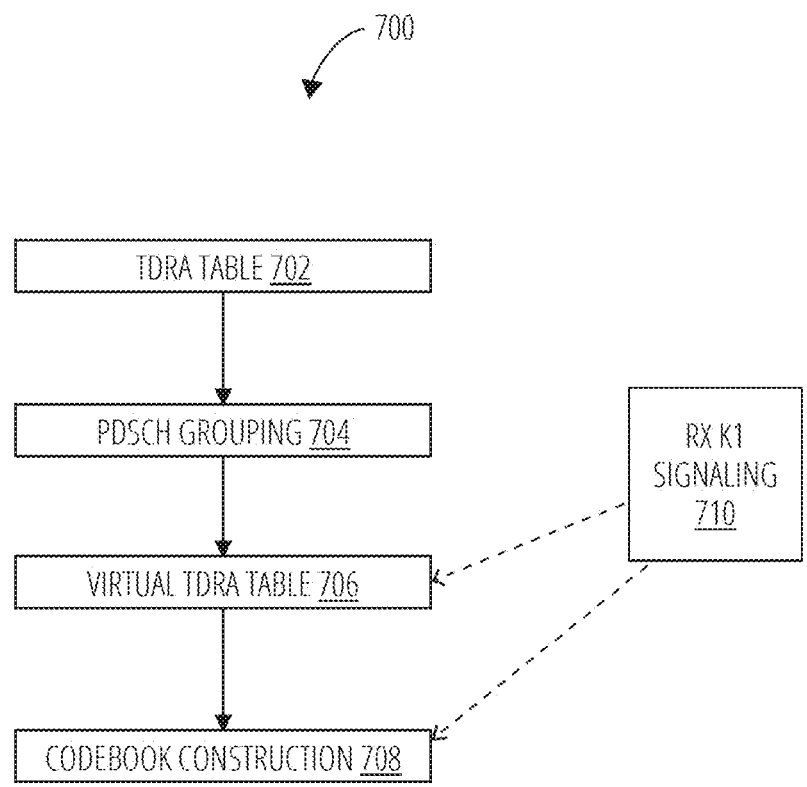
FIG. 7 is a flow diagram showing a method for generating a Type 1 HARQ-ACK codebook for multi-PDSCH transmission with multiple PUCCH resources.
Figure 8:
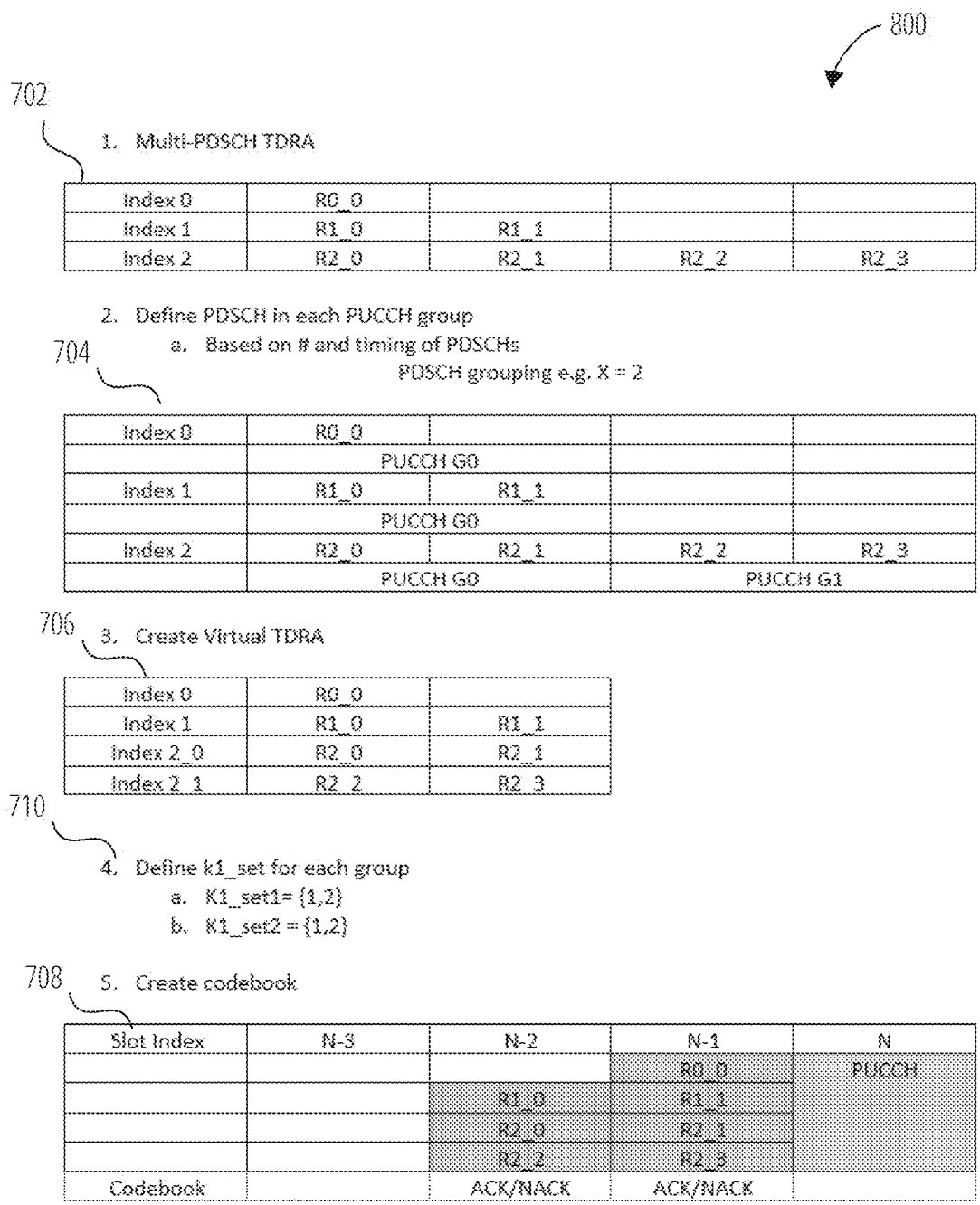
FIG. 8 is an annotated set of tables showing an example of the method of FIG. 7, according to one embodiment.

Third, this disclosure addresses a Type 1 HARQ-ACK codebook design with multiple PUCCHs. In one embodiment, FIG. 7 and FIG. 8 show, respectively, a flow diagram of a method 700 and a corresponding example tables 800 for Type 1 HARQ-ACK codebook construction with multiple PUCCHs per multi-PDSCH.

Initially, a UE is signaled information indicating a TDRA table 702. An example TDRA table 702 is shown in FIG. 8.

The UE then performs PDSCH grouping 704 to identify PDSCH set associated with each PUCCH resource. In the example shown in FIG. 8, PDSCH grouping 704 includes identifying a first PDSCH group associated with a first PUCCH and a second PDSCH group associated with a second PUCCH. Specific examples of the techniques for PDSCH grouping are described previously with reference to the techniques for identifying the PDSCH set associated with a PUCCH resource.

Next, the UE generates a virtual TDRA table 706 with the different (subset of) SLIVs belonging to a PDSCH set associated with each PUCCH resource as a separate entry in the table. In the example of FIG. 8, Index 2 is split to form two indices, one for each PUCCH resource. These are used for new virtual SLIV entries identified by the index of the PDSCH subset (e.g, PDSCH subset 0 is index 2_0 PDSCH subset 1 is index 2_1).

Finally, the UE performs codebook construction 708 based on virtual TDRA table 706. Codebook construction is also a function of Rx K1 signaling 710, described previously, e.g., K1 is common for each PDSCH set or a K1 is independent for each PDSCH set. In some embodiments, the set of candidate PDSCH reception occasions is determined according to each SLIV of each row in the virtual TDRA table and based on extension of K1 set. In other embodiments, the set of candidate PDSCH reception occasions is determined according to each SLIV of each row in the virtual TDRA table.

Figure 9:
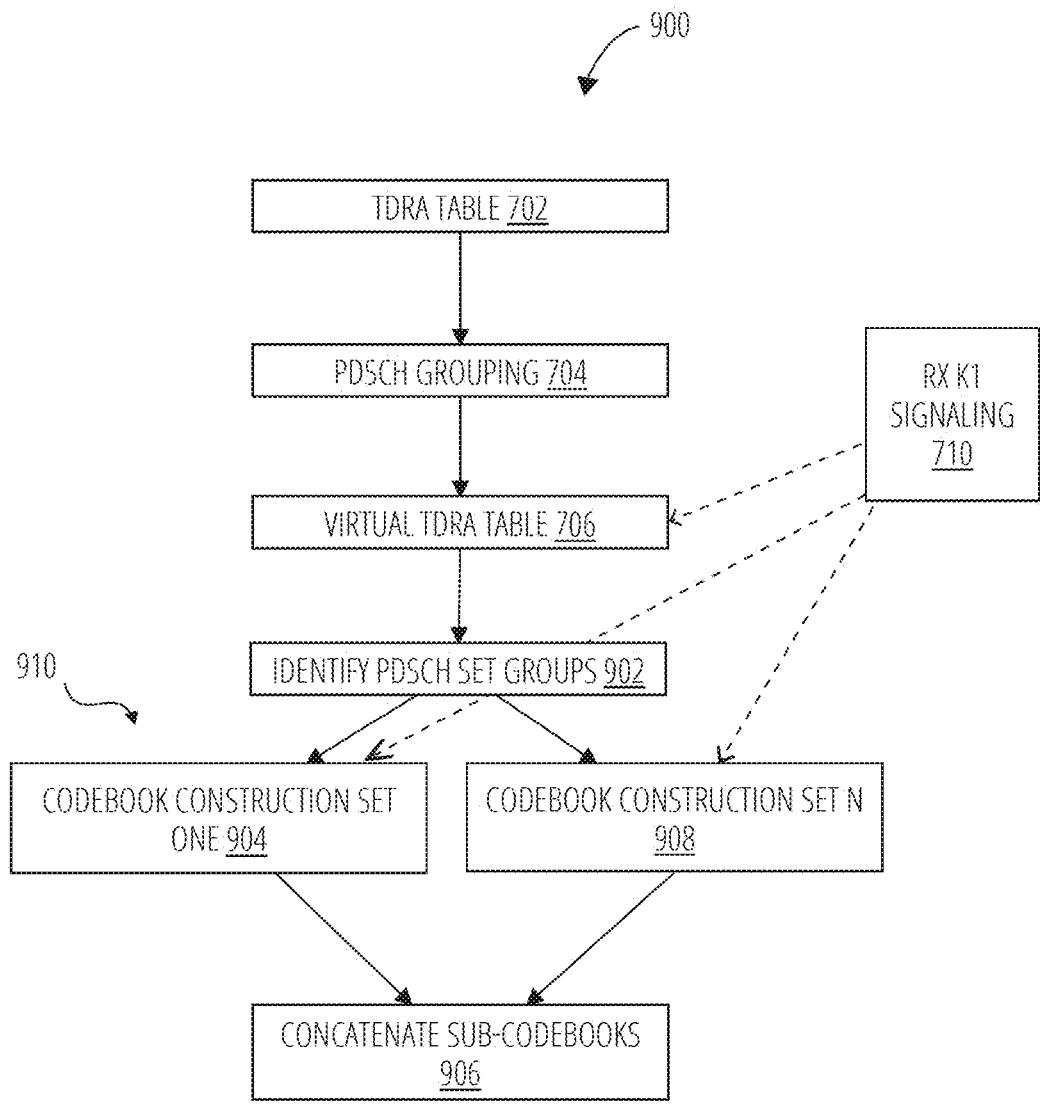
FIG. 9 is a flow diagram showing a method for generating a Type 2 HARQ-ACK codebook for multi-PDSCH transmission with multiple PUCCH resources.

Fourth, this disclosure addresses a Type 2 HARQ-ACK codebook design with multiple PUCCHs. In one embodiment, FIG. 9 shows a flow diagram of a method 900 or Type 2 HARQ-ACK codebook construction with mul-tiple PUCCHs per multi-PDSCH.

Initially, method 900 is similar to method 700 in that both methods include TDRA table 702, PDSCH grouping 704, virtual TDRA table 706, and Rx K1 signaling 710 steps.

Method 900 also includes the UE that is configured to identify PDSCH set groups 902. For example, a UE may identify a number of HARQ-ACK bits to be transmitted per PDSCH set in codebook. A first option for doing so is by setting the size of HARQ-ACK to be transmitted being equal to maximum number of SLIV entries in virtual table. Then a number of HARQ for PDSCH set one is equal to the number HARQ for PDSCH set two, and so forth. A second option is by setting the size of HARQ-ACK to be transmitted equal to the maximum number of SLIV entries in virtual table for a PDSCH set. Then, a number of HARQ for PDSCH set one may not equal to a number of HARQ for PDSCH set two, and so forth.

Method 900 includes the UE configured to construct codebook per PDSCH set independently 910 using a Type 2 codebook constructor. Thus, for each PUCCH resource, the UE performs Type 2 codebook construction on each PDSCH set independently based on its parameters. In the example of FIG. 9, a first sub-codebook is created as codebook construction set one 904 and a second sub-codebook is created as codebook construction set N 908.

The step 910 may also include C-DAI/T-DAI signaling, an example of which is shown and described later with reference to FIG. 10. A first option for such signaling is separate signaling/incrementing of C-DAI/T-DAI and PUCCH resource index (PRI) for each PDSCH set. This implies a separate sub-codebook is constructed for each PDSCH set. A second option is signaling of single C-DAI/T-DAI for all PUCCH resources, but separate signaling of PRI for each PUCCH resource. A third option is signaling of same C-DAI/T-DAI and PRI for all PUCCH resources.

Finally, FIG. 9 shows that the UE will concatenate sub-codebooks 906 from each PDSCH set based on PRI. The "sub-codebook" are concatenated for transmission. A first option is that a UE will always transmit sub-codebook. A second option is that a UE transmits sub-codebook only when a PDSCH set is to be transmitted.

Figure 10:
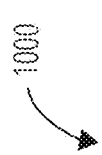
FIG. 10 is a table showing an example of C-DAI/T-DAI signaling, according to one embodiment.

FIG. 10 is a table 1000 showing the C-DAI/T-DAI behavior for the two PDSCH subsets. Each subset has its own C-DAI/T-DAI and its own PRI, which are essentially two parallel tracks in table 1000.

In a first transmission with corresponding PRI=1, subset 1 corresponds to T-DAI=3, C-DAI=1 for CC1, C-DAI=2 for CC2, and C-DAI=3 for CC3. In a second transmission with corresponding PRI=2, subset 1 corresponds to T-DAI=6, C-DAI=4 for CC1, C-DAI=5 for CC2, and C-DAI=6 for CC3.

In the first transmission with corresponding PRI=4, subset 2 corresponds to T-DAI=2, C-DAI=1 for CC1 and C-DAI=2 for CC2. In the second transmission with corresponding PRI=5, T-DAI=5, C-DAI=4 for CC1 and C-DAI=5 for CC2.

Figure 11:
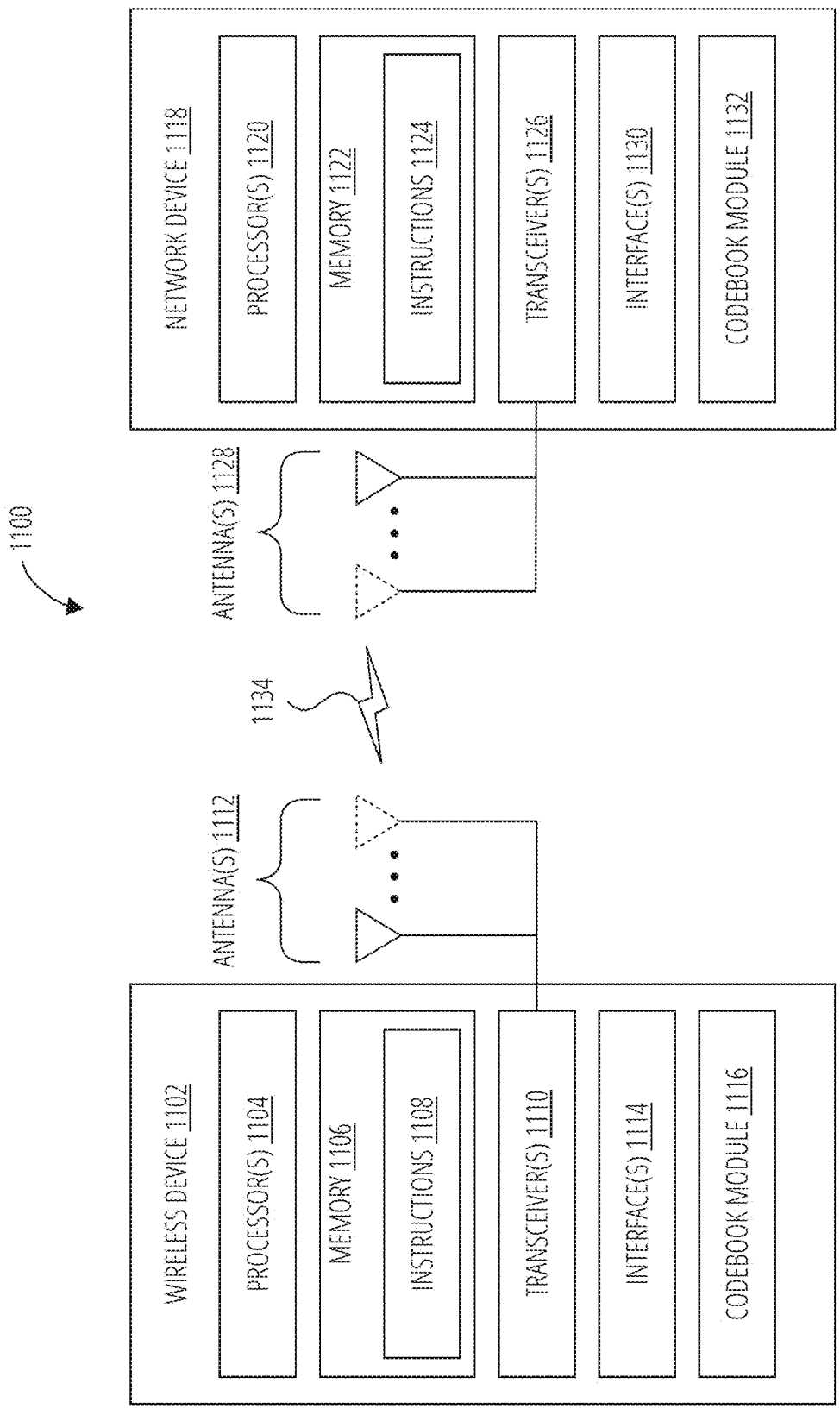
FIG. 11 is a block diagram showing a system for performing signaling between a wireless device and a network device, according to embodiments disclosed herein.

FIG. 11 illustrates a system 1100 for performing signaling 1134 between a wireless device 1102 and a network device 1118, according to embodiments disclosed herein. System 1100 may be a portion of a wireless communications system as herein described. Wireless device 1102 may be, for example, a UE of a wireless communication system. Network device 1118 may be, for example, a base station (e.g., an eNB or a gNB) of a wireless communication system.

Wireless device 1102 may include one or more processor(s) 1104. Processor(s) 1104 may execute instructions such that various operations of wireless device 1102 are performed, as described herein. Processor(s) 1104 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

Wireless device 1102 may include one or more interface(s) 1114. Interface(s) 1114 may be used to provide input to or output from wireless device 1102. For example, a wireless device 1102 that is a UE may include interface(s) 1114 such as microphones, speakers, a touchscreen, buttons, and the like in order to allow for input and/or output to the UE by a user of the UE. Other interfaces of such a UE may be made up of transmitters, receivers, and other circuitry (e.g., other than transceiver(s) 1110/antenna(s) 1112 already described) that allow for communication between the UE and other devices and may operate according to known protocols (e.g., Wi-Fi®, Bluetooth®, and the like).

Wireless device 1102 may include one or more transceiver(s) 1110 that may include radio frequency (RF) transmitter and/or receiver circuitry that use antenna(s) 1112 of wireless device 1102 to facilitate signaling (e.g., signaling 1134) to and/or from wireless device 1102 with other devices (e.g., network device 1118) according to corresponding RATs.

Wireless device 1102 may include one or more antenna(s) 1112 (e.g., one, two, four, or more). For embodiments with multiple antenna(s) 1112, wireless device 1102 may leverage the spatial diversity of such multiple antenna(s) 1112 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by wireless device 1102 may be accomplished according to precoding (or digital beamforming) that is applied at wireless device 1102 that multiplexes the data streams across antenna(s) 1112 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, wireless device 1102 may implement analog beamforming techniques, whereby phases of the signals sent by antenna(s) 1112 are relatively adjusted such that the (joint) transmission of antenna(s) 1112 can be directed (this is sometimes referred to as beam steering).

Wireless device 1102 may include one or more interface(s) 1114. Interface(s) 1114 may be used to provide input to or output from wireless device 1102. For example, a wireless device 1102 that is a UE may include interface(s) 1114 such as microphones, speakers, a touchscreen, buttons, and the like in order to allow for input and/or output to the UE by a user of the UE. Other interfaces of such a UE may be made up of made up of transmitters, receivers, and other circuitry (e.g., other than transceiver(s) 1110/antenna(s) 1112 already described) that allow for communication between the UE and other devices and may operate according to known protocols (e.g., Wi-Fi®, Bluetooth®, and the like).

Wireless device 1102 may include a codebook module 1116. Codebook module 1116 may be implemented via hardware, software, or combinations thereof. For example, codebook module 1116 may be implemented as a processor, circuit, and/or instructions 1108 stored in memory 1106 and executed by processor(s) 1104. In some examples, codebook module 1116 may be integrated within processor(s) 1104 and/or transceiver(s) 1110. For example, codebook module 1116 may be implemented by a combination of software components (e.g., executed by a DSP or a general processor) and hardware components (e.g., logic gates and circuitry) within processor(s) 1104 or transceiver(s) 1110.

Codebook module 1116 may be used for various aspects of the present disclosure, for example, aspects of FIG. 7 or FIG. 9. Codebook module 1116 is configured to perform PDSCH grouping by identifying a first PDSCH group associated with a first PUCCH and a second PDSCH group associated with a second PUCCH; generate a virtual TDRA table based on the first and second PDSCH groups, the virtual TDRA table having a first set of SLIVs corresponding to the first PDSCH group and a second set of SLIVs corresponding to the second PDSCH group; and generate the HARQ-ACK codebook based on the virtual TDRA table.

Network device 1118 may include one or more processor(s) 1120. Processor(s) 1120 may execute instructions such that various operations of network device 1118 are performed, as described herein. Processor(s) 1104 may include one or more baseband processors implemented using, for example, a CPU, a DSP, an ASIC, a controller, an FPGA device, another hardware device, a firmware device, or any combination thereof configured to perform the operations described herein.

Network device 1118 may include a memory 1122. Memory 1122 may be a non-transitory computer-readable storage medium that stores instructions 1124 (which may include, for example, the instructions being executed by processor(s) 1120). Instructions 1124 may also be referred to as program code or a computer program. Memory 1122 may also store data used by, and results computed by, processor(s) 1120.

Network device 1118 may include one or more transceiver(s) 1126 that may include RF transmitter and/or receiver circuitry that use antenna(s) 1128 of network device 1118 to facilitate signaling (e.g., signaling 1134) to and/or from network device 1118 with other devices (e.g., wireless device 1102) according to corresponding RATs.

Network device 1118 may include one or more antenna(s) 1128 (e.g., one, two, four, or more). In embodiments having multiple antenna(s) 1128, network device 1118 may perform MIMO, digital beamforming, analog beamforming, beam steering, etc., as has been described.

Network device 1118 may include one or more interface(s) 1130. Interface(s) 1130 may be used to provide input to or output from network device 1118. For example, a network device 1118 that is a base station may include interface(s) 1130 made up of transmitters, receivers, and other circuitry (e.g., other than transceiver(s) 1126/ antenna(s) 1128 already described) that enables the base station to communicate with other equipment in a core network, and/or that enables the base station to communicate with external networks, computers, databases, and the like for purposes of operations, administration, and maintenance of the base station or other equipment operably connected thereto.

Network device 1118 may include a Codebook module 1132. Codebook module 1132 may be implemented via hardware, software, or combinations thereof. For example, codebook module 1132 may be implemented as a processor, circuit, and/or instructions 1124 stored in memory 1122 and executed by processor(s) 1120. In some examples, codebook module 1132 may be integrated within processor(s) 1120 and/or transceiver(s) 1126. For example, codebook module 1132 may be implemented by a combination of software components (e.g., executed by a DSP or a general processor) and hardware components (e.g., logic gates and circuitry) within processor(s) 1120 or transceiver(s) 1126.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a user equipment (UE) configured to communicate in a fifth generation (5G) network, of generating a hybrid automatic repeat request-acknowledgement (HARQ-ACK) codebook for multi-physical downlink shared channel (PDSCH) transmission with multiple physical uplink control channel (PUCCH) resources, the method comprising:
PDSCH grouping by identifying a number of PDSCH groups, wherein each of the number of PDSCH groups is associated with a specific PUCCH, wherein the PDSCH grouping is based on a maximum number of PUCCH transmissions per the multi-PDSCH transmission, wherein the PDSCH grouping comprises splitting, at the UE, available multi-PDSCH transmissions into the number of PDSCH groups equivalent to the maximum number of PUCCH transmissions using a set of rules for assigning a number of PDSCHs to each group of the number of PDSCH groups;
generating a virtual time domain resource allocation (TDRA) table based on the number of PDSCH groups, the virtual TDRA table having sets of start and length indicators (SLIVs) corresponding to the number of PDSCH groups; and
generating the HARQ-ACK codebook based on the virtual TDRA table.

2. The method of claim 1, in which the generating the HARQ-ACK codebook is based on an extended PDSCH-to-HARQ_feedback timing indicator (K1) set.

3. The method of claim 1, further comprising determining a set of candidate PDSCH reception occasions according to each SLIV of each row in the virtual TDRA table.

4. The method of claim 1, in which the PDSCH grouping is based on a signal from a next generation Node B (gNB) explicitly indicating the number of PDSCH groups.

5. The method of claim 1, in with the HARQ-ACK codebook is a Type 1 HARQ-ACK codebook.

6. The method of claim 1, in which the HARQ-ACK codebook is a Type 2 HARQ-ACK codebook, in which the generating the HARQ-ACK codebook comprises:
generating a first Type 2 HARQ-ACK codebook for a first PDSCH group;
generating a second Type 2 HARQ-ACK codebook for a second PDSCH group; and
concatenating the first and second Type 2 HARQ-ACK codebooks.

7. The method of claim 6, further comprising identifying a number of HARQ-ACK bits to be transmitted for each of the first and second PDSCH group.

8. The method of claim 6, further comprising signaling the HARQ-ACK codebook to a gNB.

9. A non-transitory computer-readable storage medium for a user equipment (UE) configured to communicate in a fifth generation (5G) network and generate a hybrid automatic repeat request-acknowledgement (HARQ-ACK) codebook for multi-physical downlink shared channel (PDSCH) transmission with multiple physical uplink control channel (PUCCH) resources, the computer-readable storage medium including instructions that when executed by the UE, cause the UE to:
form PDSCH groups by identifying a number of PDSCH groups, wherein each of the number of PDSCH groups is associated with a specific PUCCH, wherein the PDSCH groups are based on a maximum number of PUCCH transmissions per the multi-PDSCH transmission, wherein forming the PDSCH groups comprises splitting, at the UE, available multi-PDSCH transmissions into the number of PDSCH groups equivalent to the maximum number of PUCCH transmissions using a set of rules for assigning a number of PDSCHs to each group of the number of PDSCH groups;
generate a virtual time domain resource allocation (TDRA) table based on the number of PDSCH groups, the virtual TDRA table having sets of start and length indicators (SLIVs) corresponding to the number of PDSCH groups; and
generate the HARQ-ACK codebook based on the virtual TDRA table.

10. The computer-readable storage medium of claim 9, in which the HARQ-ACK codebook is generated based on an extended PDSCH-to-HARQ_feedback timing indicator (K1) set.

11. The computer-readable storage medium of claim 9, in which the instructions further configure the UE to determine a set of candidate PDSCH reception occasions according to each SLIV of each row in the virtual TDRA table.

12. The computer-readable storage medium of claim 9, in which the PDSCH groups are based on a signal from a next generation Node B (gNB) explicitly indicating the number of PDSCH groups first and second PDSCH groups.

13. The computer-readable storage medium of claim 9, in with the HARQ-ACK codebook is a Type 1 HARQ-ACK codebook.

14. The computer-readable storage medium of claim 9, in which the HARQ-ACK codebook is a Type 2 HARQ-ACK codebook, in which the instructions further cause the UE to:
   generate a first Type 2 HARQ-ACK codebook for a first PDSCH group;
   generate a second Type 2 HARQ-ACK codebook for a second PDSCH group; and
   concatenate the first and second Type 2 HARQ-ACK codebooks.

15. The computer-readable storage medium of claim 14, in which the instructions further configure the UE to identify a number of HARQ-ACK bits to be transmitted for each of the first and second PDSCH group.

16. The computer-readable storage medium of claim 14, in which the instructions further configure the UE to signal the HARQ-ACK codebook to a gNB.

* * * * *